United States Patent
Zhao et al.

(10) Patent No.: US 11,344,891 B2
(45) Date of Patent: May 31, 2022

(54) MICROFLUIDIC CHIP

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Yingying Zhao, Beijing (CN); Peizhi Cai, Beijing (CN); Le Gu, Beijing (CN); Fengchun Pang, Beijing (CN); Yue Geng, Beijing (CN); Yuelei Xiao, Beijing (CN); Haochen Cui, Beijing (CN); Nan Zhao, Beijing (CN); Hui Liao, Beijing (CN); Wenliang Yao, Beijing (CN); Chuncheng Che, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 187 days.

(21) Appl. No.: 16/768,558

(22) PCT Filed: Nov. 13, 2019

(86) PCT No.: PCT/CN2019/118001
§ 371 (c)(1),
(2) Date: May 29, 2020

(87) PCT Pub. No.: WO2020/103739
PCT Pub. Date: May 28, 2020

(65) Prior Publication Data
US 2020/0338549 A1    Oct. 29, 2020

(30) Foreign Application Priority Data

Nov. 19, 2018  (CN) .......................... 201811378532.3

(51) Int. Cl.
*B01L 3/00*       (2006.01)
(52) U.S. Cl.
CPC ... *B01L 3/50273* (2013.01); *B01L 2300/0663* (2013.01); *B01L 2300/0809* (2013.01); *B01L 2400/0415* (2013.01)

(58) Field of Classification Search
CPC ..... B01L 2300/0654; B01L 2300/0663; B01L 2300/0809; B01L 2300/0816;
(Continued)

(56) References Cited

U.S. PATENT DOCUMENTS

| 5,200,152 A | 4/1993 | Brown |
| 2009/0097032 A1 | 4/2009 | Feng et al. |

(Continued)

FOREIGN PATENT DOCUMENTS

| CN | 102500437 A | 6/2012 |
| CN | 102788781 A | 11/2012 |

(Continued)

OTHER PUBLICATIONS

Office Action dated Nov. 25, 2019 issued in corresponding Chinese Application No. 201811378532.3.

(Continued)

*Primary Examiner* — Jennifer Wecker
*Assistant Examiner* — Jonathan Bortoli
(74) *Attorney, Agent, or Firm* — Nath, Goldberg & Meyer; Joshua B. Goldberg

(57) ABSTRACT

The present disclosure provides a microfluidic chip, including: first base substrate and a second base substrate opposite to each other; first electrode and second electrode between the first base substrate and the second base substrate and configured to control droplet to move between the first base substrate and the second base substrate according to voltages applied on the first electrode and the second electrode; light guide component configured to guide light propagating in the first base substrate to the droplet; shading component and detection component, shading component having light transmission regions spaced from each other, light transmission regions being configured to transmit light passing through the droplet to the detection component, wherein detection component is on second base substrate and is configured to obtain property of the droplet according to an intensity of the light passing through droplet and received from the light transmission regions.

17 Claims, 3 Drawing Sheets

(58) Field of Classification Search
CPC ..... B01L 2400/0415; B01L 2400/0427; B01L 3/502715; B01L 3/50273; B01L 3/502792
See application file for complete search history.

(56) References Cited

U.S. PATENT DOCUMENTS

2010/0118307 A1* 5/2010 Srinivasan ......... G01N 21/0303
          356/436
2013/0146455 A1* 6/2013 Pamula ................ C25B 9/00
          204/450

FOREIGN PATENT DOCUMENTS

| CN | 104238223 | A |   | 12/2014 |   |             |
|----|-----------|---|---|---------|---|-------------|
| CN | 107159327 | A |   | 9/2017  |   |             |
| CN | 107607475 | A | * | 1/2018  |   | B01L 3/502792 |
| CN | 107607475 | A |   | 1/2018  |   |             |
| CN | 107649223 | A |   | 2/2018  |   |             |
| CN | 107941207 | A |   | 4/2018  |   |             |
| CN | 108786942 | A |   | 11/2018 |   |             |
| WO | 2013/029155 | A1 |  | 3/2013 |   |             |

OTHER PUBLICATIONS

Office Action dated Apr. 17, 2020 issued in corresponding Chinese Application No. 201811378532.3.

* cited by examiner

MICROFLUIDIC CHIP

CROSS REFERENCE TO RELATED APPLICATION

This is a National Phase Application filed under 35 U.S.C. 371 as a national stage of PCT/CN2019/118001, filed on Nov. 13, 2019, an application claiming the benefit of Chinese patent application No. 201811378532.3, filed on Nov. 19, 2018, the content of each of which is hereby incorporated by reference in its entirety.

TECHNICAL FIELD

The present disclosure belongs to the field of microfluidic chips, and particularly relates to a microfluidic chip.

BACKGROUND

In recent years, the digital microfluidic chip technology is widely applied to the fields of biology, chemistry, medicine and the like due to the advantages of small volume, low power consumption, low cost, less required sample and reagent amount, capability of realizing independent and accurate control of droplets, short detection time, high sensitivity, easiness in integration with other devices and the like.

SUMMARY

In one aspect, the present disclosure provides a microfluidic chip including:
a first base substrate and a second base substrate opposite to each other;
a first electrode and a second electrode between the first base substrate and the second base substrate and configured to control a droplet to move between the first base substrate and the second base substrate according to voltages applied on the first electrode and the second electrode; and
a light guide component configured to guide light propagating in the first base substrate to the droplet;
a shading component and a detection component, the shading component having light transmission regions spaced from each other, the light transmission regions being configured to transmit light passing through the droplet to the detection component,
wherein the detection component is on the second base substrate and is configured to obtain a property of the droplet according to an intensity of the light passing through the droplet and received from respective ones of the light transmission regions.

According to an embodiment of the present disclosure, the first base substrate includes an optical waveguide layer in which light propagates with total reflection, and
the light guide component includes a grating structure on a side of the optical waveguide layer close to the first electrode and configured to extract a portion of light propagating in the optical waveguide layer and to collimate and guide the extracted light to the droplet.

According to an embodiment of the present disclosure, the grating structure is configured to extract monochromatic light from polychromatic light propagating in the optical waveguide layer and to collimate and guide the extracted monochromatic light to the droplet.

According to an embodiment of the present disclosure, the light propagating in the optical waveguide layer is monochromatic light.

According to an embodiment of the present disclosure, an orthographic projection of the grating structure on the first base substrate at least partially overlaps with an orthographic projection of the light transmission region of the shading component on the first base substrate.

According to an embodiment of the present disclosure, the detection component is further configured to detect an intensity of natural light passing through the droplet so as to determine a position of the droplet.

According to an embodiment of the present disclosure, the light guide component further includes a light control layer, and the light control layer is on a side of the grating structure away from the optical waveguide layer and is configured to control a position at which the light is guided out from the grating structure according to a position of the droplet detected by the detection component and to filter out non-collimated light.

According to an embodiment of the present disclosure, the light control layer includes a third electrode layer and a fourth electrode layer opposite to each other and a first electrochromic layer between the third electrode layer and the fourth electrode layer,
the third electrode layer includes a plurality of transparent third electrodes spaced apart from each other, the fourth electrode layer includes a plurality of transparent fourth electrodes spaced apart from each other, and orthographic projections of the third electrodes on the first electrochromic layer overlap with orthographic projections of the fourth electrodes on the first electrochromic layer, and
the third electrodes and the fourth electrodes are configured to control a state of the first electrochromic layer according to voltages applied on the third electrodes and the fourth electrodes so as to control the position at which the light is guided out from the grating structure and to filter out the non-collimated light.

According to an embodiment of the present disclosure, the optical waveguide layer and the grating structure are formed as a single piece.

According to an embodiment of the present disclosure, the shading component includes a fifth electrode layer and a sixth electrode layer opposite to each other and a second electrochromic layer between the fifth electrode layer and the sixth electrode layer,
the fifth electrode layer includes a plurality of transparent fifth electrodes spaced apart from each other, the sixth electrode layer includes a plurality of transparent sixth electrodes spaced apart from each other, and orthographic projections of the fifth electrodes on the second electrochromic layer overlap with orthographic projections of the sixth electrodes on the second electrochromic layer, and
the fifth electrodes and the sixth electrodes are configured to control a state of the second electrochromic layer according to voltages applied on the fifth electrodes and the sixth electrodes so as to control positions of the light transmission regions in the shading component.

According to an embodiment of the present disclosure, the shading component and the detection component are sequentially arranged on a side of the second electrode close to the second base substrate.

According to an embodiment of the present disclosure, the detection component includes a plurality of detection units arranged in an array.

According to an embodiment of the present disclosure, the detection units each include an optical sensor.

According to an embodiment of the present disclosure, the microfluidic chip further includes a first dielectric layer and a second dielectric layer opposite to each other, and a first hydrophobic layer and a second hydrophobic layer opposite to each other, wherein the first dielectric layer and the second dielectric layer are between the first electrode and the second electrode; and the first hydrophobic layer and the second hydrophobic layer are between the first dielectric layer and the second dielectric layer.

According to an embodiment of the present disclosure, the light control layer is between the first electrode and the optical waveguide layer.

According to an embodiment of the present disclosure, the light control layer is on a side of the first electrode away from the optical waveguide layer.

According to an embodiment of the present disclosure, the first base substrate includes an optical waveguide layer in which light propagates with total reflection, the light guide component includes a plurality of grating structures, each of the grating structures is on a side of the optical waveguide layer close to the first electrode and configured to extract a portion of light propagating in the optical waveguide layer and to collimate and guide the extracted light to the droplet, and the light propagating in the optical waveguide layer is polychromatic light, and colors of the light extracted from the optical waveguide layer by the plurality of grating structures are different from each other.

DETAILED DESCRIPTION

In order to make those skilled in the art better understand the technical solutions of the present disclosure, the following detailed description is given with reference to the accompanying drawings and the specific embodiments.

Unless defined otherwise, technical or scientific terms used herein shall have the ordinary meaning as understood by those skilled in the art. The use of "first", "second", and the like in the present disclosure is not intended to indicate any order, quantity, or importance, but rather is used to distinguish one element from another. The word "including" and similar words are intended to mean that the elements or items listed before the word encompass the elements, items or the equivalents thereof listed after the word, without excluding other elements or items. The word "upper", "lower", "left", "right", and the like are used only to indicate relative positional relationships, and when the absolute position of the object being described is changed, the relative positional relationships may also be changed accordingly.

A micro total analysis system for analyzing the concentration of the biological sample can be built based on the digital microfluidic chip. The micro total analysis system may include a digital microfluidic chip serving as a platform and an optical detection system at the periphery of the digital microfluidic chip and configured to analyze the concentration of the biological sample. It should be noted that the optical detection system includes a series of complex auxiliary devices, such as an optical collimation device for collimating light, a detector for detecting an intensity value of the light, an electronic control device and the like, which are arranged at the periphery of the digital microfluidic chip, resulting in that the whole micro total analysis system is quite large in size, high in power consumption and high in cost.

Figure 1:
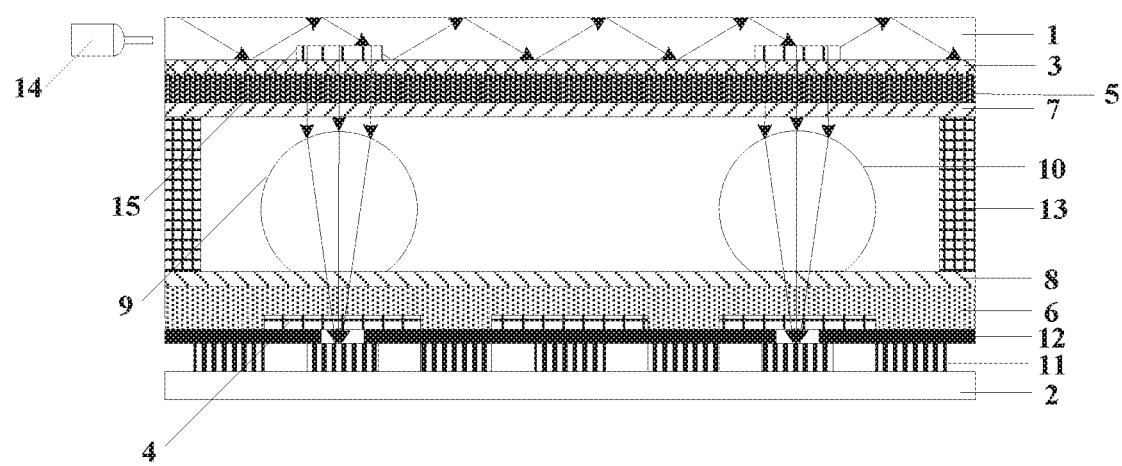
FIG. 1 is a schematic diagram of a structure of a microfluidic chip according to an embodiment of the present disclosure.

As shown in FIG. 1, the present embodiment provides a microfluidic chip including a first base substrate 1 and a second base substrate 2 opposite to each other, a first electrode 3 and a second electrode 4 between the first base substrate 1 and the second base substrate 2, a light guide component, a shading component 12 and a detection component. The first electrode 3 and the second electrode 4 are configured to control a droplet to move between the first base substrate 1 and the second base substrate 2 according to voltages applied on the first electrode 3 and the second electrode 4. The light guide component is configured to guide light propagating in the first base substrate 1 to the droplet. The shading component 12 has light transmission regions which are configured to transmit the light passing through the droplet to the detection component; and the detection component is on the second base substrate 2 and is configured to detect an intensity of the light passing through the droplet and the light transmission region and obtain a property of the droplet according to the detected intensity.

According to an embodiment of the present disclosure, the droplet may be a droplet of a biological sample, for example, blood. The property of the droplet may include a concentration, an absorbance, and the like of the biological sample. In the present embodiment, the following explanation will be given by taking the example that the detection component detects the concentration of the droplet by detecting the intensity (for example, the absorbance of the droplet) of the light passing through the droplet.

According to an embodiment of the present disclosure, in a case where the droplet is detected by the microfluidic chip, the first electrode 3 and the second electrode 4 control the droplet to move between the first base substrate 1 and the second base substrate 2 according to the voltages applied on the first electrode 3 and the second electrode 4 until the droplet reaches a detection region (i.e., the region b shown in FIG. 4) of the microfluidic chip. In an embodiment, the light guide component may guide the light propagating in the first base substrate 1 towards the droplet, so that the light passing through the droplet is incident onto the detection component through the light transmission region of the shading component 12, and therefore the detection component detects the intensity of the light passing through the droplet and received by the detection component and thus obtains the concentration of the droplet.

As can be seen, in the embodiment, the light guide component, the shading component 12 and the detection component are integrated between the first base substrate 1 and the second base substrate 2, and therefore the light guide system and the detection system required for the detection of the concentration of the droplet are integrated in the microfluidic chip of the embodiment, so that the volume of the detection system for detecting the concentration of the droplet is reduced. Meanwhile, the compact structure enables shorter distance between the detection component and the light passing through the droplet, the signal-to-noise ratio of the optical signal is improved, and the detection limit of the optical signal is reduced. In addition, because the droplet is moved between the first base substrate 1 and the second base substrate 2 by means of the voltages applied on the first electrode 3 and the second electrode 4, a complex external fluid driving control device (such as an injection pump, a pipeline and the like) is omitted, so that the integration level of the microfluidic chip is improved, and the operation difficulty of the microfluidic chip is reduced.

As shown in FIG. 1, the present embodiment provides a microfluidic chip including a first base substrate 1 and a second base substrate 2 opposite to each other, a first electrode 3 and a second electrode 4 between the first base substrate 1 and the second base substrate 2, a light guide component, a shading component 12 and a detection component. The first electrode 3 and the second electrode 4 are configured to control a droplet to move between the first base substrate 1 and the second base substrate 2 according to voltages applied on the first electrode 3 and the second electrode 4. The light guide component includes a grating structure 15. In an embodiment, the first base substrate 1 includes an optical waveguide layer configured to direct propagation of light. In an embodiment, light emitted by a light source 14 is totally reflected within the optical waveguide layer. In an embodiment, the first base substrate 1 may function as an optical waveguide. The grating structure 15 is on a side of the optical waveguide layer close to the first electrode 3 and is configured to guide out the light propagating in the optical waveguide layer with total reflection. In an embodiment, the first base substrate 1 may be provided with an opening, and the grating structure 15 is in the opening. The shading component 12 has light transmission regions which are configured to transmit the light passing through the droplet to the detection component. The detection component is on the second base substrate 2 and is configured to obtain the concentration of the droplet according to the intensity of the light which has passed through the droplet and the light transmission region. In an embodiment, an orthographic projection of the grating structure 15 on the first base substrate 1 at least partially overlaps with an orthographic projection of the light transmission region of the shading component 12 on the first base substrate 1. For example, the orthographic projection of the grating structure 15 on the first base substrate 1 completely overlaps with the orthographic projection of the light transmission region of the shading component 12 on the first base substrate 1. For another example, the orthographic projection of the grating structure on the first base substrate 1 is covered by the orthographic projection of the light transmission region of the shading component 12 on the first base substrate 1. The material of each of the first electrode 3 and the second electrode 4 includes one of indium tin oxide, molybdenum, aluminum, and copper. However, the materials of the first electrode 3 and the second electrode 4 are not limited to the above materials, and are not limited herein.

In an embodiment, in a case where the light emitted by the light source 14 is white light (i.e., polychromatic light), the grating structure 15 can extract monochromatic light from the white light and collimate the monochromatic light to the to-be-detected droplet.

It is understood that the grating equation can be expressed by the formula $(a+b)(\sin \Phi \pm \sin \theta) = k\lambda$. In the formula, a represents slit width, b represents slit pitch, and (a+b) is called the grating constant. $\Phi$ represents diffraction angle. $\theta$ represents the angle between the incident direction of light and the normal to the grating plane. k represents spectral order of the bright fringe (k=0, ±1, ±2 . . . , here, the case where the spectral order is 1 is considered), and $\lambda$ is the wavelength. Thus, light of different wavelengths has different diffraction angles $\Phi$. Therefore, the grating structure can realize the function of splitting the light.

In an embodiment, in order to cause light having a specific wavelength (e.g., red light) to exit from the grating structure 15 at a specific diffraction angle (e.g., 0°), the grating constant of the grating structure and the angle (i.e., $\theta$) between the incident direction of the light and the normal to the grating plane may be adjusted. Therefore, monochromatic light resulting from light splitting of the grating structure 15 can be collimated toward the to-be-detected droplet by adjusting the grating constant and $\theta$.

In an embodiment, in a case where the light emitted from the light source 14 is monochromatic light, the grating structure 15 can collimate the monochromatic light toward the to-be-detected droplet. In an embodiment, the grating constant and $\theta$ may be adjusted according to the grating equation $(a+b)(\sin \Phi \pm \sin \theta) = k\lambda$ and the wavelength of the monochromatic light, such that the diffraction angle $\Phi$ of the monochromatic light after passing through the grating structure is 0°. Thus, the monochromatic light can be collimated toward the droplet.

In an embodiment, the light guide component further includes a light control layer. The light control layer is on a side of the grating structure 15 away from the optical waveguide layer, and is configured to control a position at which the light is guided out from the grating structure according to the position of the droplet detected by the detection component.

Figure 2:
FIG. 2 is a schematic diagram of a structure of a light control layer according to an embodiment of the present disclosure.

In an embodiment, referring to FIG. 2, the light control layer includes a third electrode layer 111 and a fourth electrode layer 113 opposite to each other, and a first electrochromic layer 112 between the third electrode layer and the fourth electrode layer. The third electrode layer includes a plurality of transparent third electrodes spaced apart from each other, and the fourth electrode layer includes a plurality of transparent fourth electrodes spaced apart from each other, the third electrodes and the fourth electrodes are configured to control a state of the first electrochromic layer according to voltages applied on the third electrodes and the fourth electrodes so as to control the position at which the light is guided out from the grating structure 15. Orthographic projections of the third electrodes on the first electrochromic layer 112 overlap (e.g., completely overlap) with orthographic projections of the fourth electrodes on the first electrochromic layer 112.

In an embodiment, the state of the first electrochromic layer includes a light blocking state and a light transmission state. When different voltages are applied on the third electrodes and the fourth electrodes, the first electrochromic layer is in the light transmission state. When no voltage or the same voltage is applied on the third electrodes and the fourth electrodes, the first electrochromic layer is in the light blocking state. It is readily understood that, when the first electrochromic layer is in the light blocking state, both natural light and light guided out from the optical waveguide layer by the grating structure 15 cannot arrive at the surface of the droplet through the first electrochromic layer; when the first electrochromic layer is in the light transmission state, natural light and light guided out from the optical waveguide layer by the grating structure 15 can arrive at the surface of the droplet through the light transmission portion (i.e., the portion corresponding to the transparent third and fourth electrodes) of the first electrochromic layer, and the transparent third and fourth electrodes.

Figure 6:
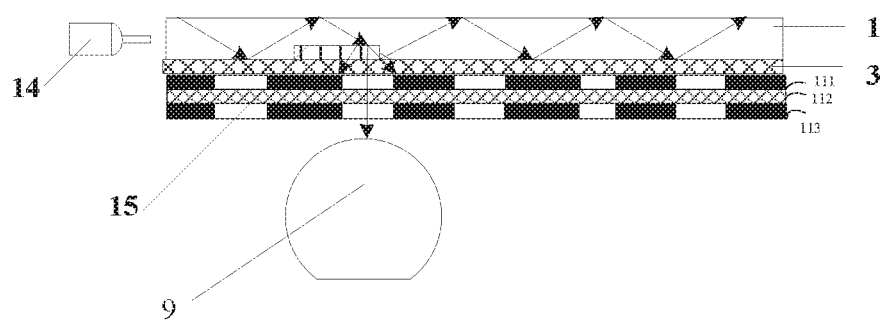
FIG. 6 is a schematic diagram illustrating a layout of a light control layer and a grating structure according to an embodiment of the disclosure.

In addition, in the case where the light emitted from the light source 14 is white light, the light control layer may also filter out other colors of light (for example, other colors of light other than red light) after light split by the grating structure 15, so that only collimated monochromatic light (for example, red light) passes through the to-be-detected droplet (as shown in FIG. 6). That is, the light control layer may filter out the non-collimated light.

In an embodiment, the light control layer may filter out light with spectral orders other than 1 (k=1).

In an embodiment, the light control layer may be arranged between the first electrode 3 and the grating structure 15. Alternatively, the light control layer may be on a side of the first electrode 3 away from the first base substrate 1, for example, as shown in FIG. 6.

The shading component 12 of the present embodiment includes a fifth electrode layer and a sixth electrode layer opposite to each other and a second electrochromic layer between the fifth electrode layer and the sixth electrode layer. The fifth electrode layer includes a plurality of transparent fifth electrodes spaced apart from each other, the sixth electrode layer includes a plurality of transparent sixth electrodes spaced apart from each other, and the fifth electrodes and the sixth electrodes are configured to control the state of the second electrochromic layer according to the voltages applied on the fifth electrodes and the sixth electrodes so as to control positions of the light transmission regions in the shading component 12. It can be understood that the light transmission region is equivalent to a light transmission slit, and the light passing through the droplet is incident onto the detection component only after passing through the light transmission slit. In this case, because the opening of the light transmission slit is relatively small, stray light which is reflected and refracted for multiple times in the droplet can be filtered out, so that the signal-to-noise ratio of the optical signal is improved, and the detection limit of the optical signal is reduced.

In an embodiment, the shading component 12 may have the same structure as the light control layer, as shown in FIG. 2. The states of the second electrochromic layer are the same as those of the first electrochromic layer, and are not described herein. It should be noted that, for the same droplet, the positions of the first electrochromic layer in the light transmission state corresponding to the droplet should correspond to the positions of the second electrochromic layer in the light transmission state, so as to ensure that the light guided out from the optical waveguide layer by the grating structure 15 is incident onto the droplet only, and the light passing through the droplet is also incident onto a portion of the detection component only, so that the portion of the detection component performs the detection operation, thereby improving the detection accuracy of the microfluidic chip of the embodiment.

In order to simplify the fabrication process of the microfluidic chip, the optical waveguide layer and the grating structure 15 are formed as a single piece. Specifically, the grating structure 15 of the present embodiment can be obtained by forming a plurality of protruding strips on a side of the optical waveguide layer close to the first electrode 3 using nanoimprint technology or laser direct writing technology. Of course, other techniques may be used to form the grating structure 15 on the optical waveguide layer, and are not limited herein. In an embodiment, the grating structure 15 is a grating structure of nanometer scale. For example, the slit width and the slit pitch of the grating structure 15 are both on the order of nanometers.

In an embodiment, the detection component includes a plurality of detection units 11 arranged in an array. The detection unit 11 may be an optical sensor, which can convert the received optical signal into a corresponding electrical signal, and in this case, the electrical signal may be analyzed to obtain the concentration of the droplet. Of course, the detection unit 11 is not limited to an optical sensor, and may also be a CCD, a CMOS, or the like, which will not be described in detail herein.

In an embodiment, the shading component 12 and the detection component are sequentially arranged on a side of the second electrode 4 close to the second base substrate 2.

In order to ensure the lossless flow of the droplet between the optical waveguide layer and the second base substrate 2, the microfluidic chip of the embodiment further includes a first dielectric layer 5 and a second dielectric layer 6 opposite to each other, and a first hydrophobic layer 7 and a second hydrophobic layer 8 opposite to each other. The first dielectric layer 5 and the second dielectric layer 6 are between the first electrode 3 and the second electrode 4, and the first hydrophobic layer 7 and the second hydrophobic layer 8 are between the first dielectric layer 5 and the second dielectric layer 6. A sealant 13 may be between the first hydrophobic layer 7 and the second hydrophobic layer 8 to seal the microfluidic chip.

It should be noted that, as shown in FIG. 1, when the distance between the first hydrophobic layer 7 and the second hydrophobic layer 8 is large, the droplet can keep a spherical shape therebetween, so that when light emitted from the opening of the grating structure is incident onto the spherical droplet, the spherical droplet itself can collimate and focus the light using the curvature of the spherical droplet, thereby improving the utilization rate of the light source.

In an embodiment, a material of each of the first dielectric layer 5 and the second dielectric layer 6 include any one of silicon nitride, silicon dioxide, negative photoresist and resin. A material of each of the first hydrophobic layer 7 and the second hydrophobic layer 8 includes teflon or parylene.

In order to clearly understand the operation principle of the microfluidic chip of the present embodiment, the explanation of the step of detecting the concentration of a droplet using the microfluidic chip will be given in the following description.

Figure 4:
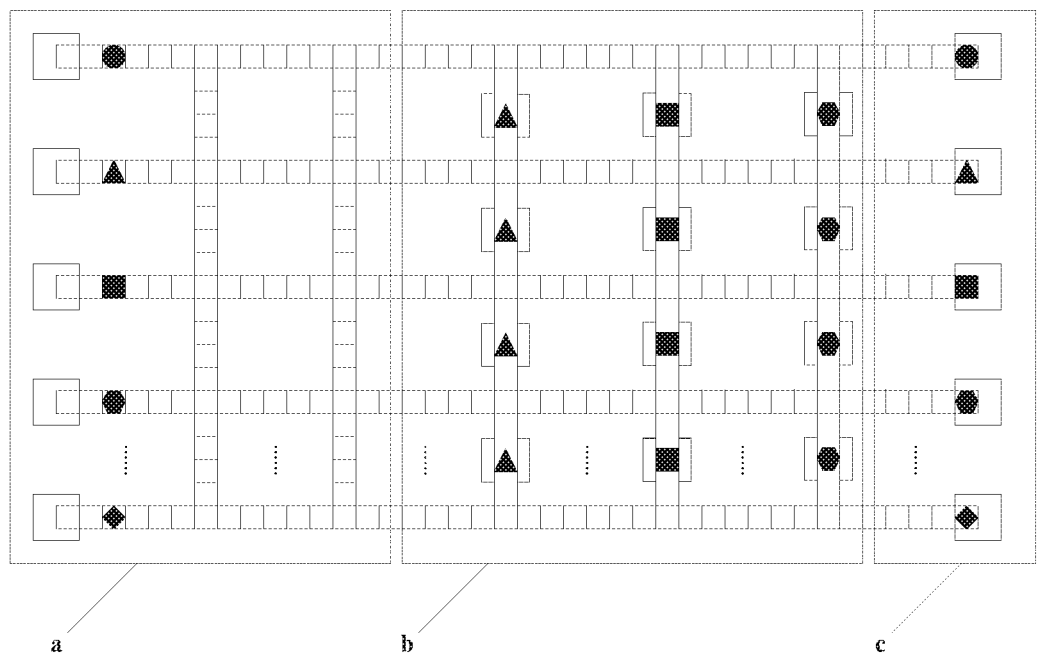
FIG. 4 is a schematic diagram of a microfluidic chip according to an embodiment of the present disclosure.

In step S1, the droplet is driven to the detection region of the microfluidic chip (i.e. region b shown in FIG. 4).

In an embodiment, the first electrode 3 and the second electrode 4 control the droplet to move between the first base substrate 1 and the second base substrate 2 according to the voltages applied on the first electrode 3 and the second electrode 4, such that the droplet reaches the detection region (i.e., region b shown in FIG. 4) of the microfluidic chip.

Figure 3:
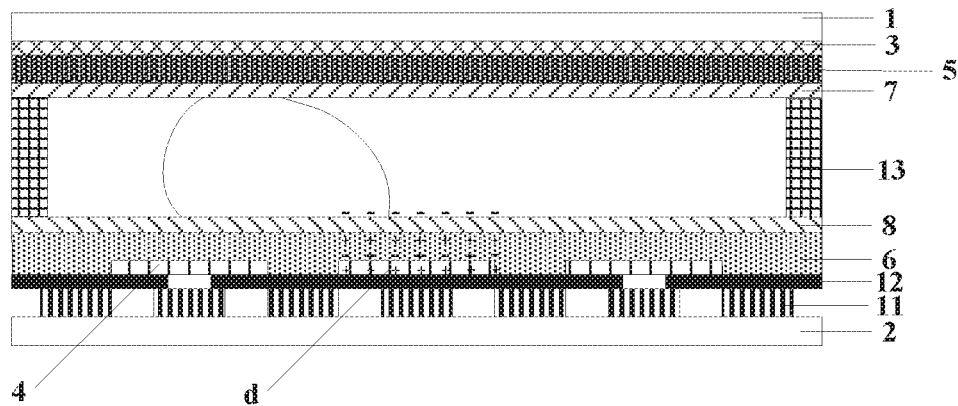
FIG. 3 is a schematic diagram of the movement of a droplet controlled by a first electrode and a second electrode of a microfluidic chip according to an embodiment of the present disclosure.

As shown in FIG. 3, the principle of controlling the movement of droplet in the embodiment will be explained by taking an example that the first electrode 3 is a plane electrode, the second electrode 4 is electrodes arranged in an array, the first electrode 3 serves as a ground electrode, and the second electrode 4 serves as a driving electrode. In an embodiment, since the droplet of the present embodiment is placed between the first hydrophobic layer 7 and the second hydrophobic layer 8, when a positive voltage is applied on the second electrode 4 (i.e., the second electrode d shown in FIG. 3) at the right side of the droplet and adjacent to the droplet, the positive voltage applied can induce equal amounts of negative charges at the upper and lower corners of the right side of the droplet. In this case, since the droplet has charges of the same polarity on both the upper and lower surfaces, the repulsive force between the charges of the same polarity increases, the droplet is more easily spread, the surface tension of the interface between solid and liquid decreases, and the droplet is changed from a hydrophobic state to a hydrophilic state. At this time, the droplet can move to the right.

In step S2, the position of the droplet in the detection region is determined.

It should be noted that, the detection component can determine the position of the droplet by detecting the natural light passing through the droplet. Therefore, in this step, all the third electrodes in the third electrode layer and all the fourth electrodes in the fourth electrode layer are applied with voltages, so as to control the first electrochromic layer therebetween to be in the light transmission state, and the natural light is incident onto the surface of the droplet through the third electrodes, the light transmission portion of the first electrochromic layer and the fourth electrodes. Correspondingly, in order to enable the detection component to detect the transmitted natural light in the detection region so as to determine the position of the droplet, all the fifth electrodes in the fifth electrode layer and all the sixth electrodes in the sixth electrode layer are also applied with voltages so as to control the second electrochromic layer between the fifth electrode layer and the sixth electrode layer to be in the light transmission state, so that the natural light can transmit through the second electrochromic layer to arrive at the detection component.

In step S3, the concentration of the droplet is detected.

In an embodiment, this step includes step S30 to step S33.

In step S30, after step S2 is completed, the voltages applied on all the third electrodes in the third electrode layer, all the fourth electrodes in the fourth electrode layer, all the fifth electrodes in the fifth electrode layer and all the sixth electrodes in the sixth electrode layer are removed, so that the first electrochromic layer and the second electrochromic layer are switched from the light transmission state in step S2 to the light blocking state.

In step S31, according to the position of the droplet detected by the detection component, the voltage is applied to the third electrode and the fourth electrode corresponding to the position of the droplet, so as to control a portion of the first electrochromic layer corresponding to the position of the droplet to change from the light blocking state to the light transmission state, and the position of the first electrochromic layer in the light transmission state is a position at which the grating structure 15 guides light out.

In step S32, according to the position of the droplet detected by the detection component, the voltage is applied on the fifth electrode and the sixth electrode corresponding to the position of the droplet, so as to control the portion of the second electrochromic layer corresponding to the position of the droplet to change from the light blocking state to the light transmission state, and the position of the second electrochromic layer in the light transmission state is the light transmission region of the shading component 12, and the positions of the light transmission regions are in one-to-one correspondence with the openings of the grating structure 15 obtained in step S31.

In an embodiment, step S32 may be executed first, and then step S31 may be executed, and the order of step S32 and step S31 is not limited herein.

In step S33, the white light source 14 is configured to emit light to the optical waveguide layer, and the white light propagating in the optical waveguide layer passes through the grating structure 15 obtained in step S31, and therefore collimated monochromatic light can be obtained. Since the droplet is spherical, it can be considered as a convex lens, and thus has a converging effect on collimated monochromatic light. The monochromatic light passing through the droplet reaches the light transmission region of the shading component 12 obtained in step S32 and is further incident onto the detection unit 11. At this time, since the detection unit 11 is an optical sensor, it can convert the intensity of the optical signal received by itself into an electrical signal for representation, so as to obtain the concentration of the droplet by utilizing lambert beer law: $A = \kappa CL = \lg I_0/I$, where A represents the absorbance of the droplet; $\kappa$ represents the proportionality constant; C represents the concentration of the droplet; L represents the thickness of the droplet; $I_0$ represents the intensity of the incident light; I represents the intensity of the transmitted light, i.e. the intensity of monochromatic light passing through the droplet detected by the optical sensor in the embodiment.

As shown in FIG. 1, the present embodiment is described by taking the example that the droplet includes a reference droplet 9 and a sample droplet 10. The reference droplet 9 and the sample droplet 10 are droplets of the same biological sample, the concentration of the reference droplet 9 is known, and the sample droplet 10 is the droplet with the concentration to be detected in the embodiment.

Specifically, according to the lambert beer law, the concentration relationship between the concentration of the sample droplet 10 and the concentration of the reference droplet 9 is as follows:

$$C_{sample} = \frac{C_{reference} \lg \frac{I_0}{I_{sample}}}{\lg \frac{I_0}{I_{reference}}} = \frac{C_{reference}(\lg I_0 - \lg I_{sample})}{\lg I_0 - \lg I_{reference}}$$

where $C_{reference}$ represents the concentration of the reference droplet 9; $C_{sample}$ represents the concentration of sample droplet 10; the intensity of incident light $I_0$ is the intensity of the monochromatic light in the present embodiment incident on the surface of the reference droplet 9 or the sample droplet 10. Since the light incident on the droplet is monochromatic in the present embodiment, $I_0$ for the reference droplet 9 is the same as that for the sample droplet 10; $I_{reference}$ represents the intensity of the transmitted light for the reference droplet 9, that is, the intensity, detected by the optical sensor in the present embodiment, of the monochromatic light passing through the droplet after chemical and physical reactions occur between the monochromatic light and the reference droplet 9; $I_{sample}$ represents the intensity of the transmitted light for the sample droplet 10. It can be seen that the concentration parameter C of the sample droplet 10 can be obtained based on $I_{reference}$ and $I_{sample}$ detected by the optical sensor of the embodiment. In addition, the absorbance parameter A of the droplet can also be obtained according to the lambert beer law.

Figure 5:
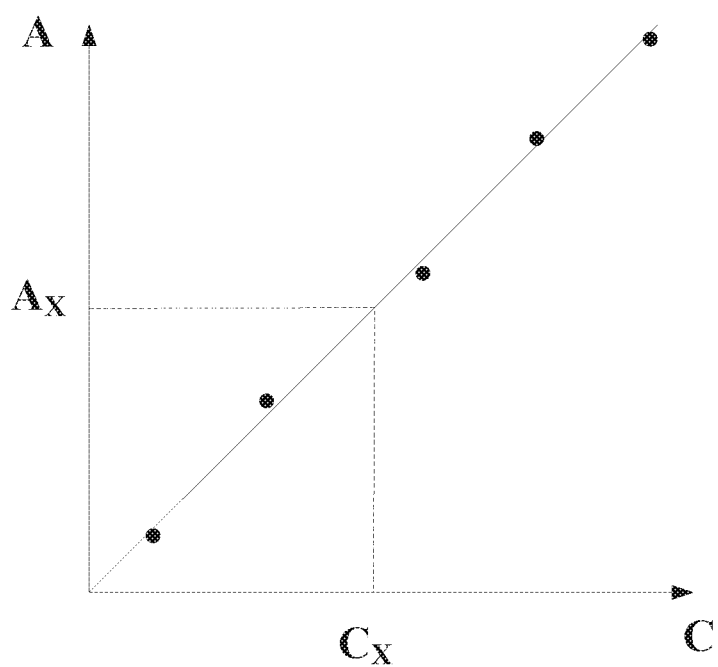
FIG. 5 is a standard curve graph of concentration parameter C and absorbance parameter A for a certain biological sample according to an embodiment of the disclosure.

Further, the droplets with different concentrations may be detected respectively to obtain the absorbance parameters of the droplets with respective concentrations, and therefore the standard curve graph of the concentration parameter C and the absorbance parameter A can be obtained, as shown in FIG. 5. Therefore, on the premise that the concentration $C_X$ (i.e., $C_{sample}$ described above) of a sample droplet is known, the absorbance parameter $A_X$ of the sample droplet 10 with that concentration can be obtained, and similarly, on the premise that the absorbance parameter $A_X$ of the sample droplet 10 is known, the concentration of the sample droplet can be obtained.

With this, the detection of the concentration of the droplet is completed.

In summary, in the present embodiment, both the optical guide component for modulating light and the detection component for detecting the concentration of the droplet are integrated in the microfluidic chip, so as to solve the problem in the prior art that the volume of the whole detection system is too large due to the fact that the detection device for detecting the concentration of the droplet is disposed at the periphery of the microfluidic chip, thereby making the microfluidic chip of the present embodiment more flexible to operate and more widely applicable. In addition, the position where the light is guided out by the grating structure 15 and the position of the light transmission region of the shading component 12 in the embodiment can be dynamically adjusted according to the position of the droplet, so that the light guided out from the optical waveguide layer by the grating structure 15 is only incident onto the droplet, and the light passing through the droplet is also incident onto the detection unit 11 corresponding to the droplet only, and therefore the corresponding detection unit 11 can performs detection operation, thereby improving the detection accuracy of the microfluidic chip of the embodiment.

In an embodiment, as shown in FIG. 4, the microfluidic chip of the embodiment has three regions, namely, a pre-treatment region (i.e., region a shown in FIG. 4) for separating and fusing the droplet to obtain to-be-detected droplets with different concentrations, a detection region (i.e., region b shown in FIG. 4) for detecting the properties of the droplets, and a waste region (i.e., region c shown in FIG. 4) for recycling the detected droplets. Three shapes in the detection region of FIG. 4 represent three different kinds of droplets, respectively, and do not represent the shape of the droplet itself. The droplets represented by the same shape in the same column represent droplets of the same substance at different concentrations, respectively. It can be seen that the microfluidic chip of FIG. 4 is used to detect at least three different kinds of droplets, and each kind of droplet has at least four different concentration values.

Thus, when the microfluidic chip of the embodiment is used to detect the concentration of the droplet represented by triangle in FIG. 4, the grating structure at this position will split the light emitted from the white light source 14 into various monochromatic light with different wavelengths. Monochromatic light (for example, red light) with a specific wavelength may be vertically emitted out from the optical waveguide layer by adjusting parameters (for example, grating constant) of the grating structure, and the light control layer can direct the vertically emitted red light to a to-be-detected droplet, so that light with other colors can be filtered out, and the concentration of the droplet represented by triangle can be detected. The concentration of the droplet represented by square can be detected in a similar manner. In an embodiment, parameters (e.g., grating constant) of the grating structure at the position of the square can be adjusted such that monochromatic light (e.g., green light) with a specific wavelength is vertically emitted out from the optical waveguide layer, and the light control layer can direct the vertically emitted green light to a to-be-detected droplet, so as to filter out light with other colors, and the concentration of the droplet represented by square can be detected. Meanwhile, the microfluidic chip of the embodiment further detects droplets represented by other shapes according to the steps of detecting droplets represented by triangle and square, thereby improving the detection efficiency of the microfluidic chip provided by the present embodiment.

In summary, since different kinds of droplets have different transmitting effects on light with different wavelengths, light of appropriate wavelengths can be selected for different kinds of droplets. In an embodiment, grating structures with different parameters can be provided in the first base substrate, so that the microfluidic chip according to the embodiment can achieve the purpose of detecting multiple different kinds of droplets simultaneously, thereby improving the detection efficiency of the microfluidic chip according to the embodiment.

It could be understood that the above embodiments are merely exemplary embodiments employed to illustrate the principle of the present disclosure, and the present disclosure is not limited thereto. It will be apparent to those skilled in the art that various changes and modifications can be made without departing from the spirit and scope of the present disclosure, and these changes and modifications are also considered to be within the protection scope of the present disclosure.

What is claimed is:

1. A microfluidic chip, comprising:
   a first base substrate and a second base substrate opposite to each other;
   a first electrode and a second electrode between the first base substrate and the second base substrate and configured to control a droplet to move between the first base substrate and the second base substrate according to voltages applied on the first electrode and the second electrode; and
   a light guide component configured to guide light propagating in the first base substrate to the droplet;
   a shading component and a detection component, the shading component having light transmission regions spaced from each other, the light transmission regions being configured to transmit light passing through the droplet to the detection component,
   wherein the detection component is on the second base substrate and is configured to obtain a property of the droplet according to an intensity of the light passing through the droplet and received from respective ones of the light transmission regions.

2. The microfluidic chip of claim 1, wherein
   the first base substrate comprises an optical waveguide layer in which light propagates with total reflection, and
   the light guide component comprises a grating structure on a side of the optical waveguide layer close to the first electrode and configured to extract a portion of light propagating in the optical waveguide layer and to collimate and guide the extracted light to the droplet.

3. The microfluidic chip of claim 2, wherein
   the grating structure is configured to extract monochromatic light from polychromatic light propagating in the optical waveguide layer and to collimate and guide the extracted monochromatic light to the droplet.

4. The microfluidic chip of claim 2, wherein
   the light propagating in the optical waveguide layer is monochromatic light.

5. The microfluidic chip of claim 2, wherein
an orthographic projection of the grating structure on the first base substrate at least partially overlaps with an orthographic projection of the light transmission region of the shading component on the first base substrate.

6. The microfluidic chip of claim 2, wherein
the detection component is further configured to detect an intensity of natural light passing through the droplet so as to determine a position of the droplet.

7. The microfluidic chip of claim 2, wherein the light guide component further comprises a light control layer, and the light control layer is on a side of the grating structure away from the optical waveguide layer and is configured to control a position at which the light is guided out from the grating structure according to a position of the droplet detected by the detection component and to filter out non-collimated light.

8. The microfluidic chip of claim 7, wherein
the light control layer comprises a third electrode layer and a fourth electrode layer opposite to each other and a first electrochromic layer between the third electrode layer and the fourth electrode layer,
the third electrode layer comprises a plurality of transparent third electrodes spaced apart from each other, the fourth electrode layer comprises a plurality of transparent fourth electrodes spaced apart from each other, and orthographic projections of the third electrodes on the first electrochromic layer overlap with orthographic projections of the fourth electrodes on the first electrochromic layer, and
the third electrodes and the fourth electrodes are configured to control a state of the first electrochromic layer according to voltages applied on the third electrodes and the fourth electrodes so as to control the position at which the light is guided out from the grating structure and to filter out the non-collimated light.

9. The microfluidic chip of claim 2, wherein the optical waveguide layer and the grating structure are formed as a single piece.

10. The microfluidic chip of claim 1, wherein
the shading component comprises a fifth electrode layer and a sixth electrode layer opposite to each other and a second electrochromic layer between the fifth electrode layer and the sixth electrode layer,
the fifth electrode layer comprises a plurality of transparent fifth electrodes spaced apart from each other, the sixth electrode layer comprises a plurality of transparent sixth electrodes spaced apart from each other, and orthographic projections of the fifth electrodes on the second electrochromic layer overlap with orthographic projections of the sixth electrodes on the second electrochromic layer, and
the fifth electrodes and the sixth electrodes are configured to control a state of the second electrochromic layer according to voltages applied on the fifth electrodes and the sixth electrodes so as to control positions of the light transmission regions in the shading component.

11. The microfluidic chip of claim 1, wherein the shading component and the detection component are sequentially arranged on a side of the second electrode close to the second base substrate.

12. The microfluidic chip of claim 1, wherein the detection component comprises a plurality of detection units arranged in an array.

13. The microfluidic chip of claim 12, wherein the detection units each comprise an optical sensor.

14. The microfluidic chip of claim 1, further comprising a first dielectric layer and a second dielectric layer opposite to each other, and a first hydrophobic layer and a second hydrophobic layer opposite to each other, wherein
the first dielectric layer and the second dielectric layer are between the first electrode and the second electrode; and
the first hydrophobic layer and the second hydrophobic layer are between the first dielectric layer and the second dielectric layer.

15. The microfluidic chip of claim 7, wherein the light control layer is between the first electrode and the optical waveguide layer.

16. The microfluidic chip of claim 7, wherein the light control layer is on a side of the first electrode away from the optical waveguide layer.

17. The microfluidic chip of claim 1, wherein
the first base substrate comprises an optical waveguide layer in which light propagates with total reflection,
the light guide component comprises a plurality of grating structures, each of the grating structures is on a side of the optical waveguide layer close to the first electrode and configured to extract a portion of light propagating in the optical waveguide layer and to collimate and guide the extracted light to the droplet, and
the light propagating in the optical waveguide layer is polychromatic light, and colors of the light extracted from the optical waveguide layer by the plurality of grating structures are different from each other.

* * * * *